(12) United States Patent
Cegielski-Johnson et al.

(10) Patent No.: US 12,294,631 B2
(45) Date of Patent: May 6, 2025

(54) ANALYTICS SYSTEMS FOR MEASURING VIRALITY AND NETWORK EFFECTS IN MULTI-DOMAIN INTERACTIONS

(71) Applicant: Microsoft Technology Licensing, LLC, Redmond, WA (US)

(72) Inventors: Maksymilian Cegielski-Johnson, Redmond, WA (US); Hongwei Liang, Bellevue, WA (US); Sandipan Ganguly, Redmond, WA (US); Samantha Sifleet, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/451,494

(22) Filed: Aug. 17, 2023

(65) Prior Publication Data

US 2025/0063101 A1    Feb. 20, 2025

(51) Int. Cl.
*H04L 67/50*   (2022.01)
*G06F 16/34*   (2019.01)
*G06F 16/901*  (2019.01)

(52) U.S. Cl.
CPC .......... *H04L 67/535* (2022.05); *G06F 16/345* (2019.01); *G06F 16/9024* (2019.01)

(58) Field of Classification Search
CPC ... H04L 67/535; G06F 16/345; G06F 16/9024
See application file for complete search history.

(56) References Cited

U.S. PATENT DOCUMENTS

| | | | | |
|---|---|---|---|---|
| 5,581,663 A * | 12/1996 | Zlotin | ...................... | G06N 5/01 706/919 |
| 8,977,629 B2 * | 3/2015 | Goswami | ............. | G06V 20/695 707/723 |
| 9,235,806 B2 * | 1/2016 | Sweeney | ................... | G06N 5/02 |
| 10,831,452 B1 * | 11/2020 | Hunter | ................... | G06F 16/951 |
| 10,909,442 B1 * | 2/2021 | Szarvas | ..................... | G06N 3/08 |
| 11,294,937 B1 * | 4/2022 | Beskales | ................ | G06F 16/285 |
| 11,295,375 B1 * | 4/2022 | Chitrapura | ............. | G06Q 50/01 |
| 11,669,753 B1 * | 6/2023 | Gupta | ........................ | G06N 5/04 706/12 |
| 11,720,806 B2 * | 8/2023 | Martelaro | ................. | G06N 5/04 706/46 |
| 11,929,896 B1 * | 3/2024 | Shemesh | .................. | H04L 43/08 |
| 2003/0227877 A1 * | 12/2003 | Kar | ......................... | H04L 45/08 370/254 |
| 2013/0036109 A1 * | 2/2013 | Kulick | ................ | G06F 16/9536 707/E17.014 |

(Continued)

*Primary Examiner* — Michael Won
(74) *Attorney, Agent, or Firm* — NovoTechIP International PLLC

(57) ABSTRACT

A system and method measuring data, from user devices, regarding user interactions with a Software-as-a-Service (SaaS) product installed in each of the user devices, using a measurement module in the processor to generate measured data. The measured data is then modeled as a graph, using a graphing application in the processor, wherein the graph includes a plurality of varying metrics, each representing different attributes of a structure of the graph. A viral effectiveness index (VEI) as a single metric summarizing core graph attributes of the graph is determined from the plurality of the varying metrics of the graph using a viral effectiveness index (VEI) module in an analytics application in the processor.

24 Claims, 10 Drawing Sheets

(56) References Cited

U.S. PATENT DOCUMENTS

| | | | |
|---|---|---|---|
| 2013/0268260 A1* | 10/2013 | Lundberg | G06F 11/3664 |
| | | | 704/8 |
| 2014/0279078 A1* | 9/2014 | Nukala | G06Q 30/0276 |
| | | | 705/14.73 |
| 2015/0046385 A1* | 2/2015 | Shimizu | G06F 3/0653 |
| | | | 706/52 |
| 2019/0317728 A1* | 10/2019 | Chen | G06N 20/20 |
| 2020/0034481 A1* | 1/2020 | Asplund | G06F 16/35 |
| 2020/0081445 A1* | 3/2020 | Stetson | B60W 60/001 |
| 2020/0104775 A1* | 4/2020 | Chintalapati | G06Q 10/06393 |
| 2020/0293564 A1* | 9/2020 | Reh | G06N 3/08 |
| 2020/0364268 A1* | 11/2020 | Xu | G06F 16/9024 |
| 2021/0019325 A1* | 1/2021 | Edge | G06F 16/254 |
| 2021/0073282 A1* | 3/2021 | Hunter | G06N 3/086 |
| 2022/0237228 A1* | 7/2022 | Xu | G06F 16/2474 |
| 2023/0060753 A1* | 3/2023 | Matsuoka | G06Q 10/063114 |
| 2023/0067084 A1* | 3/2023 | Mohanty | G06F 8/60 |
| 2023/0090878 A1* | 3/2023 | Yea | G06T 9/007 |
| | | | 382/232 |
| 2024/0161172 A1* | 5/2024 | Pan | G06Q 30/0631 |

* cited by examiner

VIRAL EFFECTIVENESS INDEX SUB-METRICS

| 410 | SINGLE-USER INTENSITY: VERTEX DEGREE | A VERTEX'S DEGREE IS THE NUMBER OF EDGES THAT ARE CONNECTED TO IT, OR HOW MANY NEIGHBORS IT HAS. WE TAKE THE MEAN ACROSS ALL VERTICES. |
|---|---|---|
| 420 | NEIGHBOR INTENSITY: LOCAL CLUSTERING COEFFICIENT | THE LOCAL CLUSTERING COEFFICIENT IS A MEASURE OF HOW WELL-CONNECTED A VERTEX'S NEIGHBORHOOD IS IN A GRAPH. IT IS DEFINED AS THE RATIO OF THE NUMBER OF 3-EDGE CYCLES IN A VERTEX'S NEIGHBORHOOD TO THE MAXIMUM NUMBER OF 3-EDGE CYCLES POSSIBLE IN THAT NEIGHBORHOOD. WE TAKE THE MEAN ACROSS ALL VERTICES. |
| 430 | OVERALL USAGE: CONNECTED COMPONENT ENTROPY | WE DEFINE CONNECTED COMPONENT ENTROPY AS THE LEVEL OF UNCERTAINTY IN THE DISTRIBUTION OF VERTICES ACROSS THE GRAPH COMPONENTS, BY CALCULATING THE INFORMATIONAL ENTROPY OF THE COMPONENT SIZE DISTRIBUTION. THIS HELPS PROVIDE INSIGHTS INTO THE STRUCTURE AND ORGANIZATION OF THE GRAPH, INCLUDING THE PREVALENCE OF SMALL OR LARGE COMPONENTS. WE EXPONENTIATE THIS VALUE AND COMPUTE THE RECIPROCAL. |
| 440 | GENERAL DENSITY: AVERAGE SHORTEST PATH | THE AVERAGE SHORTEST PATH IS THE AVERAGE LENGTH OF PATHS (SEQUENCE OF VERTICES THAT ARE CONNECTED BY EDGES) BETWEEN ALL PAIRS OF VERTICES IN A GRAPH. BECAUSE THIS IS THE MOST COMPUTATIONALLY EXPENSIVE METRIC, WE APPROXIMATE THIS VALUE BY SAMPLING, AND THEN COMPUTE THE RECIPROCAL. |

FIG. 4

ANALYTICS SYSTEMS FOR MEASURING VIRALITY AND NETWORK EFFECTS IN MULTI-DOMAIN INTERACTIONS

BACKGROUND

User interaction is a critical part of the usage of business-to-business (B2B) and business-to-customer (B2C) Software-as-a-Service (SaaS) for software products, such as Software-as-a-Service (SaaS) products and software collaborative products. It is therefore important to measure and analyze user interaction, which can be done by modelling the data as a graph (also known as network) using a graphing application, which are known in the technology for modelling software data. The graphs produced from this data modelling can reveal insights about how different users or groups interact with each other, which can help identify key product influencers for marketing or product development. The graphs can also help in understanding product engagement, such as detecting patterns of user behavior for product satisfaction. In addition, the graphs can be used to detect fraudulent or malicious activity, monitoring patterns that do not fit expected behavior. This can help prevent fraud or security threats. Still further, these graphs can help optimize services and manage resources more efficiently. This can help the product team identify workflows or scenarios to develop new features or tools to support the customer.

Graphs generated by such graphing programs can be measured with a number of varying metrics, each representing different attributes of the graph structure. However, a technical problem is that the average target audience for metrics and dashboards is not typically fluent in graph terminology or intricacies. In other words, the audience analyzing graph and user interactions typically has a different knowledge base than the audience that consumes metrics for product design and decision making, and continuously explaining graph theory during metric consumption can be time and labor intensive. Moreover, a further technical problem is that having multiple metrics can lead to difficulty in understanding the relative trade-offs between different aspects of a graph structure.

More specifically, not all software and SaaS providers measure user interactions with graphs. As such, these software and SaaS providers receive limited and shallow insights about how users interact with their products. Further, in many cases, in depth measurement of user interaction is currently limited to a single product or platform. As such, software and SaaS providers currently typically are unable to measure how multiple products or platforms simultaneously affect user interaction. Thus, software and SaaS providers typically only obtain insights for products or platforms individually, and must infer any possible interactions with regard to multiple products or platforms on their own.

Accordingly, there is a need to enable users to better understand software product engagement.

SUMMARY

In an implementation, a system is provided including a processor and a machine-readable medium storing executable instructions that, when executed, cause the processor, alone or in combination with other processors, to perform operations including measuring data, from a plurality of user devices, regarding user interactions with a software product accessible to each of the user devices, using a measurement module in the processor to generate measured data, modeling the measured data as a graph model generated based on the measured data, using a graphing application, wherein the graph model includes a plurality of varying sub-metrics, each representing different attributes of a structure of the graph model, and determining, from the plurality of the varying sub-metrics of the graph model, a viral effectiveness index (VEI) as a single metric summarizing core graph attributes of the graph model using a VEI module in an analytics application in the processor, and generating natural language insights and recommendations regarding the software product by providing the VEI generated by the analytics application to an artificial intelligence (AI) system coupled to the analytics application.

In another implementation, a system is provided including a processor and a machine-readable medium storing executable instructions that, when executed, cause the processor, alone or in combination with other processors, to perform operations including measuring user interaction data, from a plurality of user devices, regarding user interactions with a software product accessible to each of the user devices, using a measurement module in the processor to generate measured data, partitioning the measured data into n partitions based on an extrinsic key or property, using a measured interactions partitioning and graphing module in an analytics application in the processor, generating n graphs, one graph for each partition of the partitioned measured user interaction data, using the measured interactions partitioning and graphing module, which includes a graphing application, in the analytics application, determining, from the n graphs of the partitioned measured user interaction data, n viral effectiveness indexes (VEIs), one for each of the n graphs, wherein each VEI is a single metric summarizing core graph attributes of the corresponding one of the n graphs using a viral effectiveness index (VEI) module in an analytics application in the processor, and generating natural language insights and recommendations regarding the software product by providing the VEIs generated by the analytics application to an artificial intelligence (AI) system coupled to the analytics application.

In another implementation, a method is provided for measuring data, from a plurality of user devices, regarding user interactions with a software product accessible to each of the user devices, using a measurement module in a processor to generate measured data, modeling the measured data as a graph model generated based on the measured data, using a graphing application, wherein the graph includes a plurality of varying sub-metrics, each representing different attributes of a structure of the graph, determining, from the plurality of the varying sub-metrics of the graph, a viral effectiveness index (VEI) as a single metric summarizing core graph attributes of the graph using a viral effectiveness index (VEI) module in an analytics application in the processor, and generating natural language insights and recommendations regarding the software product by providing the VEI generated by the analytics application to an artificial intelligence (AI) system coupled to the analytics application.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 depicts an example of viral effectiveness index sub-metrics in accordance with aspects of this disclosure.

DETAILED DESCRIPTION

Figure 1:
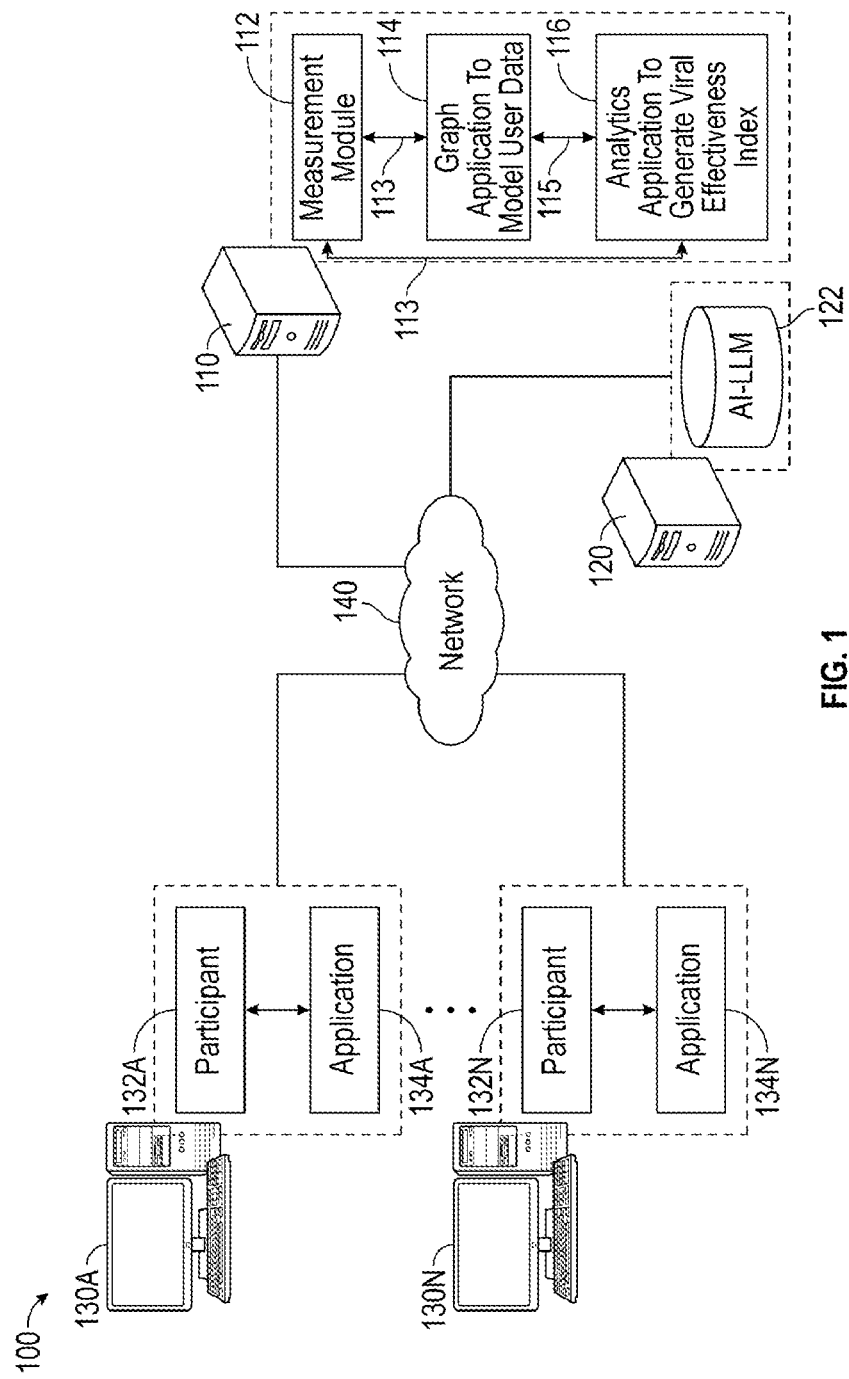
FIG. 1 depicts an example analytics system upon which aspects of this disclosure may be implemented.

The present disclosure relates to developer tools and a system for collecting, measuring, and processing metrics for viral effectiveness indexes (VEIs) which can be used to summarize user interaction with one or more applications that are being monitored. More specifically, the VEIs provide a simplified presentation of data regarding user interactions with such applications that are being modelled as graphs. Using such VEIs allows for identifying key product influencers for marketing or product development and to understand product engagement by end users even if the users do not have expertise in analyzing graphs. The technical problem being solved is that product developers may have limited expertise in graph theory and are not able to extract product usage insights on their own. The present disclosure provides a technical solution by using single VEIs to represent large amounts of graph data, thereby greatly simplifying the presentation of data. In some implementations, this is achieved by providing a user experience (UX) that leverages a language model such as a large language model (LLM) applied as a customer success agent that generates recommendations and insights from the VEI that may be easily consumed by the product developer. Another implementation is to provide an algorithm for producing the VEI as applied in a system that further leverages an LLM to produce the UX.

More specifically, to facilitate better decision making and analysis, the present disclosure provides a system and method, that, given a series of graphs, computes and monitors a single metric called Viral Effectiveness Index (VEI) for each graph, which can be used to summarize core graph attributes and measure network effects. These VEI metrics, along with the sub-metrics that are drawn from partitioning the measured interactions and then graphing the partitioned measured interactions, are then processed into natural language by a generative artificial intelligence (AI) system (also referred to as a customer success agent), which generates recommendations and insights that can be consumed by both product development teams and their customers. Based on this, product development teams can be notified of potential product gaps based off the monitored customer interaction, as well as being provided with recommendations for experimentation to further investigate and improve the product and features thereof. Customers can also be notified of products and feature recommendations that would improve their usage and interaction, with the intention to maximize customer return on investment (ROI) and satisfaction.

Accordingly, the present disclosure pertains to a tool, either implemented as a standalone server or as a cloud service, that implements a single index such as a VEI, or, if desired, a limited number of such VEI indexes, for each generated graph. The use of such VEI indexes provides a concise and comprehensive summary of graph connectedness, to understand user interaction with products such as software applications in an easy-to-consume way. This can provide actionable insights to drive product development, product engagement and security to ensure customer success. Further, this provides a tool for providing a simplified presentation of complex graph data, thereby offering an improvement in graphing technology by allowing complex graphs to be useful to those without the expertise to extract useful information from the graphs themselves.

To this end, using this tool (i.e., systems and methods for generating VEIs from complex graphs), multiple graphs (or subgraphs of a large graph) can be processed to produce such VEI metrics for each graph. The graphs/subgraphs can be indexed by an intrinsic or extrinsic property of the graph. Each VEI metric provides a comparative index which can be used to rank graphs or contrast graphs to a baseline. Standalone, this VEI index can be used to provide a general sense of a graph's over-all connectedness, with a larger value being preferred, indicating high amounts of user interaction and engagement. The tool disclosed herein can model one product/platform, or multiple products/platforms, by representing each distinct product/platform as a distinct graph property. For example, if the tool is modelling interaction across k products/platforms, then each element of the graph will have k properties.

Users interact or collaborate with many other users, either directly (e.g., sending a message or liking a post) or indirectly (e.g., coediting a document, or visiting the same web page). In other words, a user's neighbors interact or collaborate with the user and with each other. Overall, there is dense interaction or collaboration within the graph. The VEI in accordance with the present disclosure measures the characteristics of interaction or collaboration, in which there is a dense, viral pattern of engagement and interaction among users. These features are described further hereinafter with regard to FIGS. 4A and 4B.

FIG. 1 illustrates an example analytics system 100, upon which aspects of this disclosure may be implemented. The analytics system 100 includes a server 110, which itself includes a measurement module 112, a graph application 114 to model user data regarding the interactions with applications 134A-134N by users 132A-132N on user devices 130A-130N, and an analytics application 116 to generate the VEIs regarding this interaction by the users 132A-132N for each graph generated by the graph application 114.

While shown as one server, the server 110 may represent a plurality of servers that work together to deliver the functions and services provided by each engine or application included in the server 110. The server 110 may operate as a shared resource server located at an enterprise accessible by various computer client devices such as the client devices 130A-130N. The server 110 may also operate as a cloud-based server for analytic services for one or more applications 134A-134N on the client devices 130A-130N. The applications 134A-134N can allow for multiple participants 132A-132N to engage in collaboration with one another, via the network 140 and the server 110, or to perform tasks individually without collaboration. In either case, the graph application 114 and the analytics application 116 allow for analyzing user interaction with the applications 134A-134N to determine virality and network effects in multi-domain interactions. It is noted that the term "user interaction," as used herein, refers to how often users interact with software products, the manner in which the users interact with the software products, what features of the software products the users actually use, the types of problems the users encounter in using the software products (which could be determined by the help requests the users make, for example), etc.

The server 110 and the client devices 130A-130N are connected to one another via a network 140, which can be a cloud network or any other type of network capable of supporting analytic operations regarding user interaction, as described herein, between multiple participants 132A-132N. In addition, an artificial intelligence (AI) server 120 is also connected to the network 140. This AI server 120 can include an AI large language model (AI-LLM) 122, which is a subset of artificial intelligence that has been trained on vast quantities of text data to produce human-like responses to dialogue or other natural language inputs. As will be discussed below, the server 110 communicates with the AI-LLM 122 to provide AI responses to commands made by the analytics application 116 in the server 110.

Figure 2:
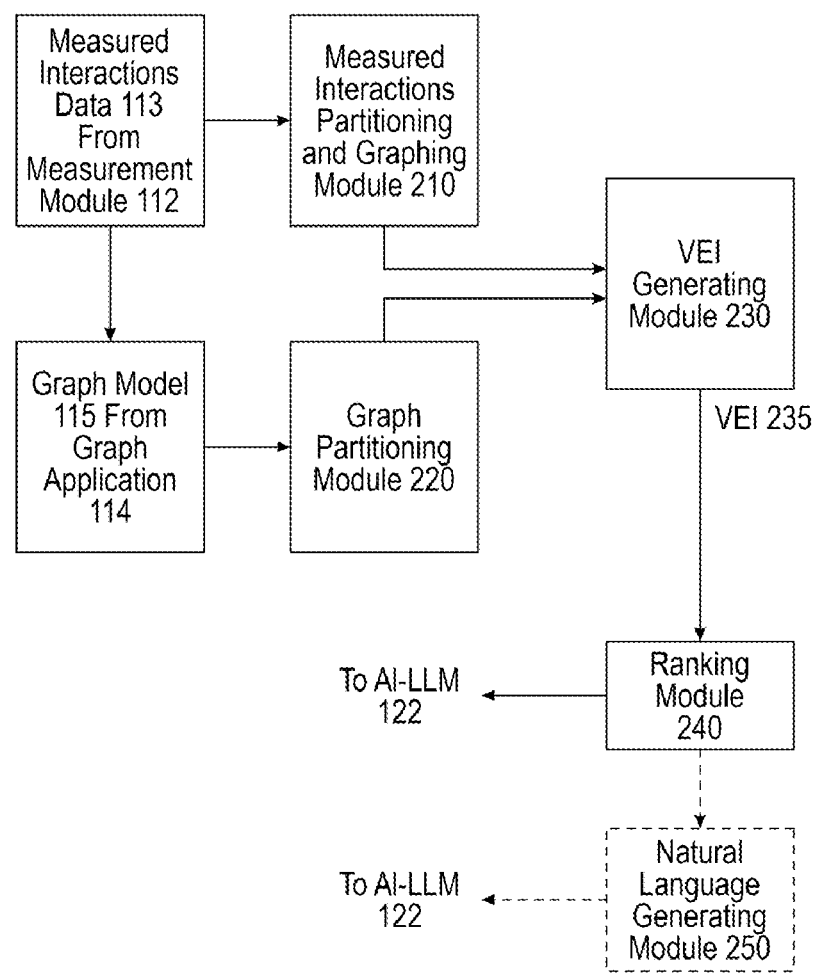
FIG. 2 depicts an example of modules of the analytics application of FIG. 1 used to generate VEIs) in accordance with aspects of this disclosure.
Figure 3:
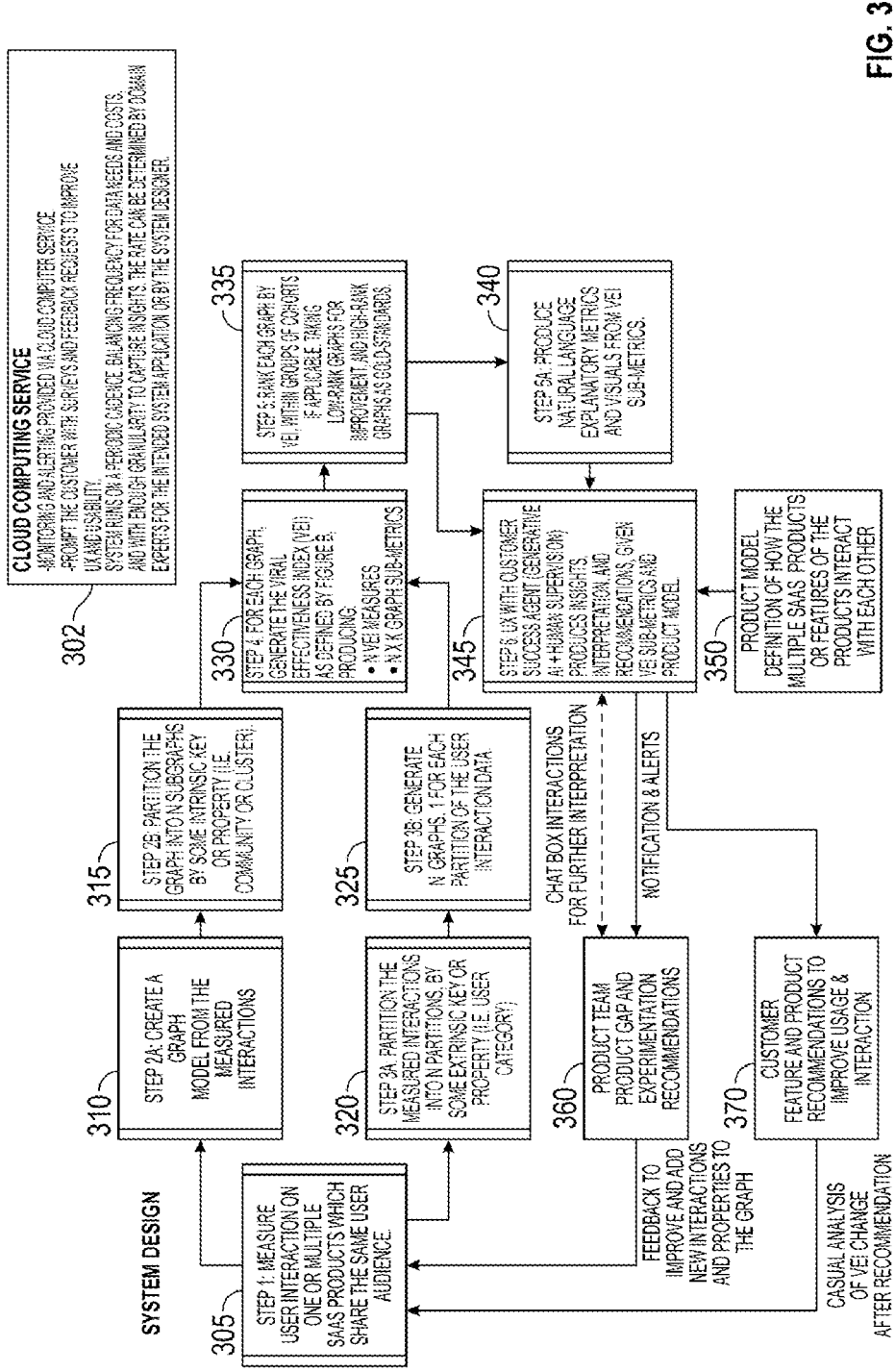
FIG. 3 depicts a flowchart of measuring virality and network effects in multi-domain interactions using the system such as shown in FIG. 1 and the analytic application shown in FIG. 2 in accordance with aspects of this disclosure.

Referring to FIGS. 1-3, the analytics application 116 includes a measured interactions partitioning and graphing module 210 which receives measured interactions data 113 from the measurement module 112 of FIG. 1. This measurement module 112 measures user interaction on one or multiple software products, for example, SaaS products which can share a same user audience, such as applications 134A-134N, installed on user devices 130A-130N, to provide the measured interactions data 113, or accessible to the users via the user devices, for example, via a cloud service. It is noted that although SaaS products are discussed in the following discussion as an example of the present disclosure, the present disclosure is not limited to such SaaS products, and can be used with all types of software products where measuring user interaction would be useful.

Measuring user interaction is shown as step 1 (e.g., numeral 305) in FIG. 3. Following step 305, two distinct different strategies can be used for generating n graphs that can be used for comparison. In a first strategy, the measured interactions partitioning and graphing module 210 partitions the measured interactions data 113 into n partitions by an extrinsic key or property, such as a user category. This is shown as step 3a (e.g., numeral 320) in FIG. 3. Then, in step 3b, the measured interactions partitioning and graphing module 210 generates n graphs, one for each of the partitions of the user interaction data (e.g., see numeral 325 in FIG. 3). In FIG. 2, the measured interactions partitioning and graphing module 210 can use the same graphing application as is used in graph application 114 to generate the n graphs. It is noted that although it is shown that the n graphs are generated by the measured interactions partitioning and graphing module 210, as an alternative implementation measured interactions partitioning and graphing module 210 could perform the partitioning and then feed the partitioned data back to the graph application 114 which could be used to generate these n graphs. In either case, using this first strategy one already has n distinct graphs (step 320), for example a graph for each B2B customer product usage. Thus, it will not be necessary to combine two different graphs into one graph. Therefore, one can optimize computationally by partitioning this data beforehand and calculating VEIs asynchronously for each graph.

On the other hand, in accordance with a second strategy, the graph partitioning module 220 receives a graph model 115 from graph application 114 of FIG. 1. This graph model 115 is created by the graphing application 114 from the measured interactions 113 provided by the measurement module 112. This is shown as step 2a (e.g., numeral 310) in FIG. 3. The graph partitioning module 220 partitions the graph model 115 from the graph application 114 into n subgraphs by an intrinsic key or property, such as a community or cluster, as shown in Step 2b of FIG. 3 (e.g., numeral 315 in FIG. 3). For example, if there is only one graph 115 (e.g., step 310), then there is a need to split the single graph into n subgraphs based on intrinsic properties of the graph structure itself, such as communities or clusters. As an example, this could be a large ecosystem, such as a university, and the clustering strategies could be used to find communities within the graph (in this example colleges or departments within the university) and then computing VEIs for each subgraph.

In both of the above strategies, the same graphing application can be used, if desired, with the only difference being where the graphing application is used in the system. For example, for the above-described second strategy (steps 310 and 315) the graphing application would be used in step 310, where the graphing application would identify communities. For the above-described first strategy (steps 320 and 325), the partitions are likely part of the data collected in step 305. Therefore, one already has an idea for partitions in step 320, and then the graph application is used to create the graphs in step 325. As such, in FIG. 3, a single choice can be made as to whether to use either the first strategy (steps 320 and 325) or the second strategy (steps 310 and 315), as opposed to both happening simultaneously. In other words, after step 305, the next step is either step 310 or step 320, not both. Of course, if desired, the two different strategies could be performed in sequence to generate two different perspectives for the user interaction data being monitored by the measurement module 112.

Referring to FIGS. 2 and 3, in both the first and second strategies described above, the outputs of the measured interactions partitioning and graphing module 210 and the graph partitioning module 220 are used by the VEI generating module 230 to generate the VEIs 235. As shown by Step 4 in FIG. 3 (numeral 330), the VEI generating module 230 generates, for each of the graphs produced by the measured interactions partitioning and graphing module 210 and the graph partitioning module 220, a VEI 235, as defined in FIGS. 4A and 4B, to produce n VEI measures and n×k graph sub-metrics. This will be described in further detail below with regard to FIG. 4.

The ranking module 240 ranks each graph produced by the VEI generating module 230, within groups of cohorts, if applicable. This ranking is based on the value of the VEIs 235 generated by the VEI generating module 230. The low-rank graphs from the VEI generating module 230 can be used for improving the user interaction of the applications 134A-134N, while the high-ranking graphs from the VEI generating module 230 can be used as standards for the applications 134A-134N. This ranking operation is shown as step 5 (numeral 335) in FIG. 3.

A natural language generating module 250 can be provided in the analytics application 116 to produce natural language explanatory metrics and visuals from the VEI-sub-metrics. This is shown in step 5a (numeral 340) in FIG. 3. Alternatively, the natural language explanatory metrics and visuals can be produced by the AI-LLM 122 if the output of either the VEI generating module 230 or the ranking module 240 is provided to the AI-LLM 122 without passing through a natural language generating module 250.

When the natural language explanatory metrics and visuals from the VEI-sub-metrics is produced by a natural language generating module 250, rather than being produced by the AI-LLM 122, the natural language explanatory metrics and visuals from the natural language generating module 250 can be provided to the AI-LLM 122. As shown in step 6 (345 in FIG. 3), the AI-LLM 122 can serve as a customer success agent for generative AI+human supervision to produce insights, interpretation and recommendations based on the VEI sub-metrics and a product model 350. The product model 350 is a definition of how the multiple software products, such as the applications 134A-134N in the client devices 130A-130N, or features of the software products, interact with each other.

As shown in FIG. 3, outputs of the AI-LLM 122 regarding insights, interpretation and recommendations produced from the AI-LLM 122 based on the output of the analytics application 116 can be used by a product team 360 for determining product gap and experimentation recommendations. Additionally, the insights, interpretation and recommendations produced from the AI-LLM 122 based on the output from the analytics application 116 can be provided to the customers 370 for feature and product recommendations to improve usage and interaction of the customers with the applications 134A-134N installed in the user devices 130A-130N.

In summary, the system shown and described in FIGS. 1-3 can provide a cloud computing service 302 for monitoring user interaction with the applications 134A-134N installed in the user devices 130A-130N and alerting either a product team or users themselves regarding information determined by the analytics application 116. This cloud computing service 302 can prompt customers with surveys and feedback requests to improve the customer interaction and useability. As shown in FIG. 3, the cloud computing service 302 which the present system can provide runs on a periodic cadence, balancing frequency for data needs and costs, and with enough granularity to capture insights. The rate can be determined by domain experts for the intended system application or by the system designer.

Referring next to FIG. 4, an example of viral effectiveness index (VEI) sub-metrics, and a definition of this VEI are shown, in accordance with aspects of this disclosure. In this example, four sub-metrics are shown, each pertaining to aspects of graphs 115 (e.g., graphs which have been generated by the graph application 114) to model user data based on user interaction data with the applications 134A-134N by users 130A-130N, as measured by the measurement module 112 of FIG. 1. The four exemplary sub-metrics of the graph 115 shown in FIG. 4 are vertex degree 410 (as a measure of single user intensity), a local clustering coefficient 420 (as a measure of neighbor intensity), connected component entropy 430 (as a measure of overall usage), and average shortest path 440 (as a measure of general density). Of course, other sub-metrics of the generated graphs could be used either in addition to the four sub-metrics 410-440 or as an alternative to the four sub-metrics 410-440.

Still referring to FIG. the vertex's degree 410 is a number of edges that a vertex in the graph 115 is connected to, or how many neighbors the vertex has in the graph. Generally, the vertex degree 410 is the mean across all vertices that comprise the graph 115. The local clustering coefficient 420 is a measure of how well-connected a vertex's neighborhood is in the graph 115. It can be defined as a ratio of the number of 3-edge cycles in a vertex's neighborhood to the maximum number of 3-edge cycles possible in that neighborhood. Again, the local clustering coefficient 420 is the mean across all vertices in the graph 115.

The connected component entropy 430 is a level of uncertainty in the distribution of vertices across the graph components of the graph 115. It can be calculated as the informational entropy of the component size distribution. This helps provide insights into the structure and organization of the graph 115, including the prevalence of small or large components. The average shortest path 440 is the average length of paths (i.e., a sequence of vertices that are connected by edges) between all pairs of vertices in the graph 115. Because this is the most computationally expensive sub-metric, its value is approximated by sampling, and then computing the reciprocal to provide the average shortest path 440.

Still referring to FIG. 4, ideally the sub-metrics 410 (vertex degree) and 420 (local clustering coefficient) increase since this indicates a high degree of user interaction regarding the applications 134A-134N being monitored by the analytics system 100. On the other hand, it is desirable for the sub-metrics 430 (connected component entropy) and 440 (average shortest path) to decrease since this will also indicate a high degree of user interaction regarding the applications 134A-134N being monitored by the analytics system 100. Also, the sub-metrics 430 and 440 interact with one another, and, therefore, can be considered as a single metric if desired. Further, transform functions can be applied to any of the sub-metrics 410-440 individually to adjust weighting, if desired. In any case, as shown in FIGS. 2, 3 and 4, the VEI generating module 230 aggregates the sub-metrics 410, 420, 430 and 440 to calculate the VEI 235 as a single metric of the virality and effectiveness of user interaction with the applications 134A-134N for each graph generated from the measurement data of this user interaction determined by the measurement module 112.

Figure 5A:
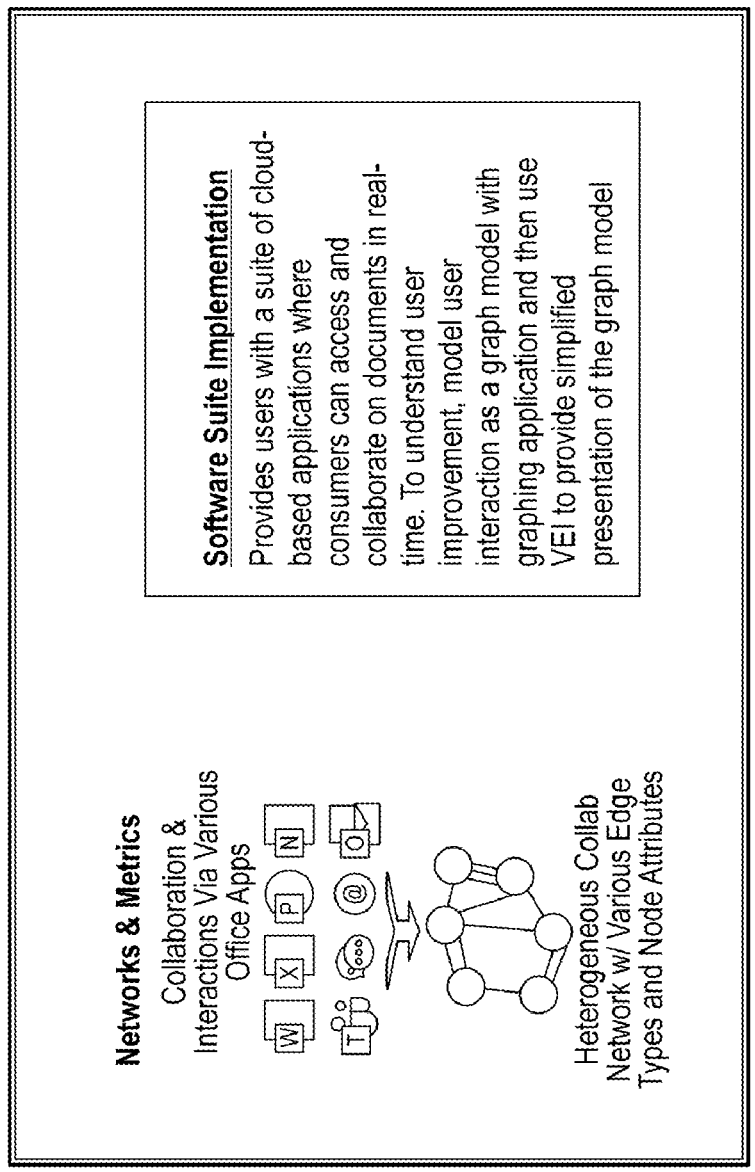
FIGS. 5A-5C show an example of implementation of measuring virality and network effects in multi-domain interactions in a software suite platform, such as Microsoft Office 365™ applications, in accordance with aspects of this disclosure.
Figure 5B:
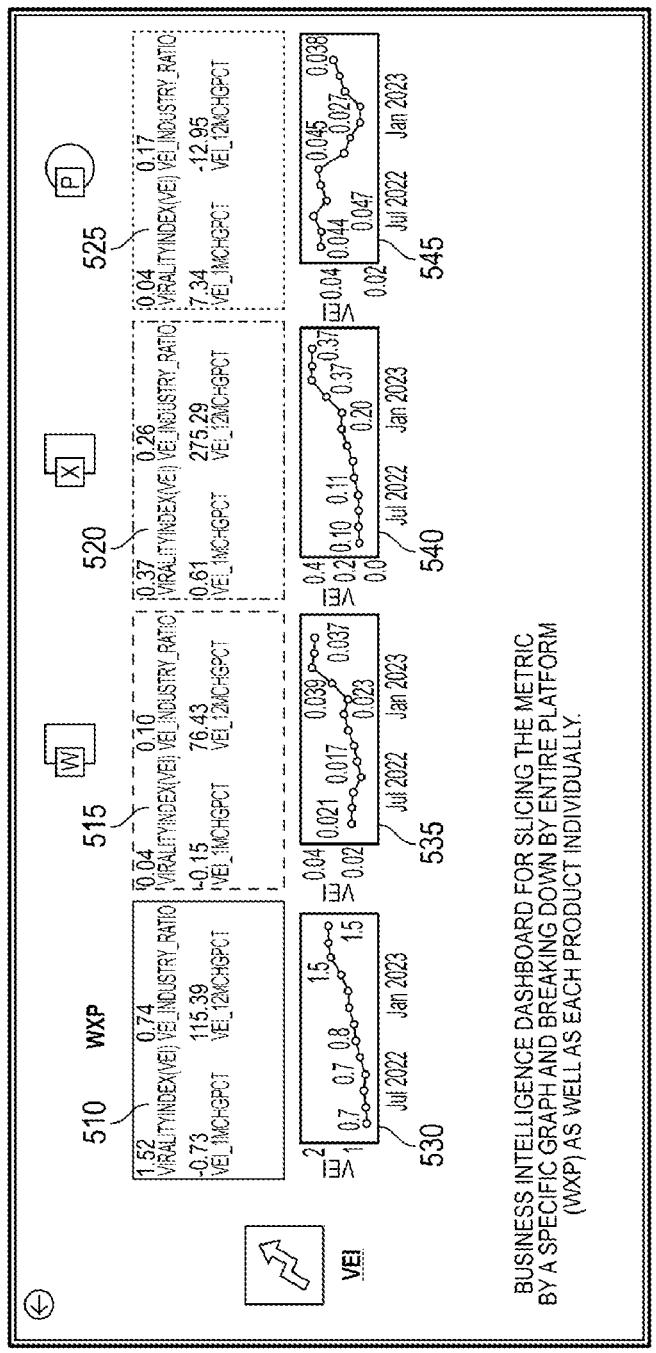
Figure 5C:
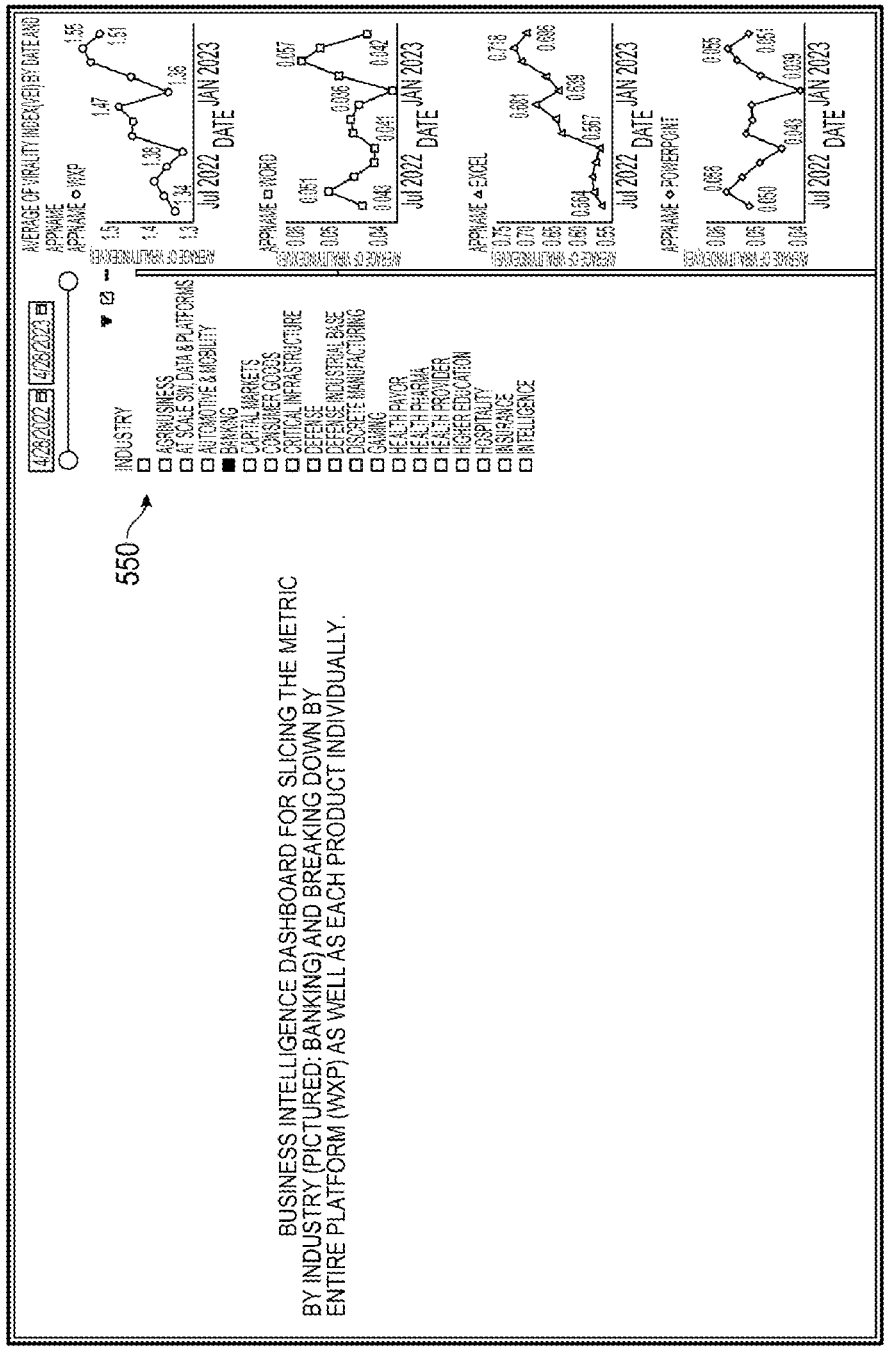

Referring to FIGS. 5A-5C, these drawings show an implementation of the present disclosure on a suite of software products, such as the Microsoft Office M365™ suite (hereinafter referred to as M365). These software suites are also referred to herein as a platform. Specifically, such software suites provide users with a suite of cloud-based applications where consumers can access and collaborate with one another on documents in real time. As shown FIG. 5A, the M365 suite includes multiple well-known programs, including a word processing application (e.g., Word™), a spreadsheet application (e.g., Excel™), a presentation application (e.g., PowerPoint™), an email application (Outlook™), a collaboration program Teams™, etc. These applications can be used individually, or they can be used in cooperation with one another by each user individually or by multiple users in collaboration with each other. Further, the applications in the software suite can be used for collaboration with regard to documents in real time.

As an example, the collaboration application can be used to collaborate between multiple users sharing documents which have been created by one or more of the users using the word processing application, the presentation application, the spreadsheet application, etc. The present disclosure is directed to a simplified approach using VEIs as described above for determining the amount of user interaction with each of the individual applications in the software suite, as well as determining overall user interaction with the entire software suite. This type of analysis generates a large amount of data with regard to user interaction which can be summarized with graphing applications. However, as noted above, it takes a significant amount of expertise to be able to interpret the graphs produced by such graphing applications. Therefore, by creating VEIs in accordance with the preceding description, the analysis can be greatly simplified.

As shown in the left side of FIG. 5A, networks and metrics are created using the techniques discussed above with regard to FIGS. 1-4 to provide collaboration and interactions between various software applications. These collaborations and interactions can be formed into a heterogeneous, collaborative graph, or network, with various edge types and node attributes (as shown in the lower left portion of FIG. 5A). Forming such a heterogeneous, collaborative network or graph can be performed using a graphing application, such as shown in FIG. 1 with regard to the graphing application 114.

FIG. 5B shows a business intelligence dashboard, which can be prepared using VEIs as discussed above for slicing the metric by a specific graph, and breaking down an entire platform (e.g., the software suite), as well as showing VEIs for each of the three products, being analyzed.

As shown in FIG. 5B, a data individual box is provided to show individual values for each of the individual programs, as well as for the entire platform. Specifically, data box 510 is provided for the WXP platform, data box 515 is provided for the word processing application, data box 520 is provided for spreadsheet application and data box 525 is provided for the presentation application. In the example shown in FIG. 5B, each of the data boxes 510-525 shows VEIs such as a Virality, Industry ratio, 1M Change Percentage, and 12M Change Percentage. These metrics show the VEIs for a specific graph (in this case a B2B customer). Since each B2B customer belongs to a specific industry, one can compare the VEIs of the specific graph to all others in the same cohort, as mentioned in FIG. 3 (step 335). In this case, one can provide the VEI_INDUSTRY_RATIO which is the VEI for the given customer, divided by the mean VEI of all other customers in the same industry. One could also use the median, if desired, instead of the mean. Also, in FIG. 5B, 1M Change Percentage means the percentage of change of the VEI in a current observation period of one month, and 12M Change Percentage means the percentage of changes of the VEI in a current observation period of twelve months. In each case, these individual values shown in FIGS. 5B and 5C are VEIs of different metrics that have been graphed. These VEIs shown in FIGS. 5B and 5C, of course, are merely exemplary of the data that can be analyzed and shown.

In addition, simplified charts which plot out the VEIs are provided under each of the boxes, showing changes of the single value VEI metrics over time. Specifically, chart 530 is provided for the VEI for virality for the platform, chart 535 is provided for the VEI for virality for the word processing application, graph 540 is provided for the VEI for virality for the spreadsheet application and graph 545 is provided for the VEI virality for the presentation application. In FIG. 5B, the VEI for virality is shown in the charts 530-545 for the time period from July 2022 to January 2023. The individual boxes 510-525 in the example of FIG. 5B can show the latest values for the VEI metrics. However, by selecting points on the charts 530-545, the boxes 510-525 can be changed to show VEI metric values at past times, if desired. Also, the other values in the data boxes 510-525 can be charted.

FIG. 5C shows a business intelligence dashboard for slicing the metrics by industry and breaking down the selected metrics by industry for the entire platform), as well as for each of the individual products. Referring to FIG. 5C, the example shows the selected industry 550 as being banking, although numerous other industries are shown, and, of course, any industry could be provided in the analysis. The right side of FIG. 5C shows charts of the virality index VEI by date and app name for the entire platform as well as the individual products. Again, the use of the VEI chart of the virality is just an example, and other VEIs derived from the graphs 115 produced by the graphing application 114 could be used for the simplified VEI charts shown in FIGS. 5B and 5C.

Using the dashboard shown in FIGS. 5B and 5C provides individual metrics in the form of VEI's that make it much easier for users who do not have expertise in graphing applications to derive useful information regarding user interaction with the applications under analysis. It is noted, of course, that the techniques disclosed herein can be used for any type of application, and are not limited to the specific examples provided herein.

Figure 6:
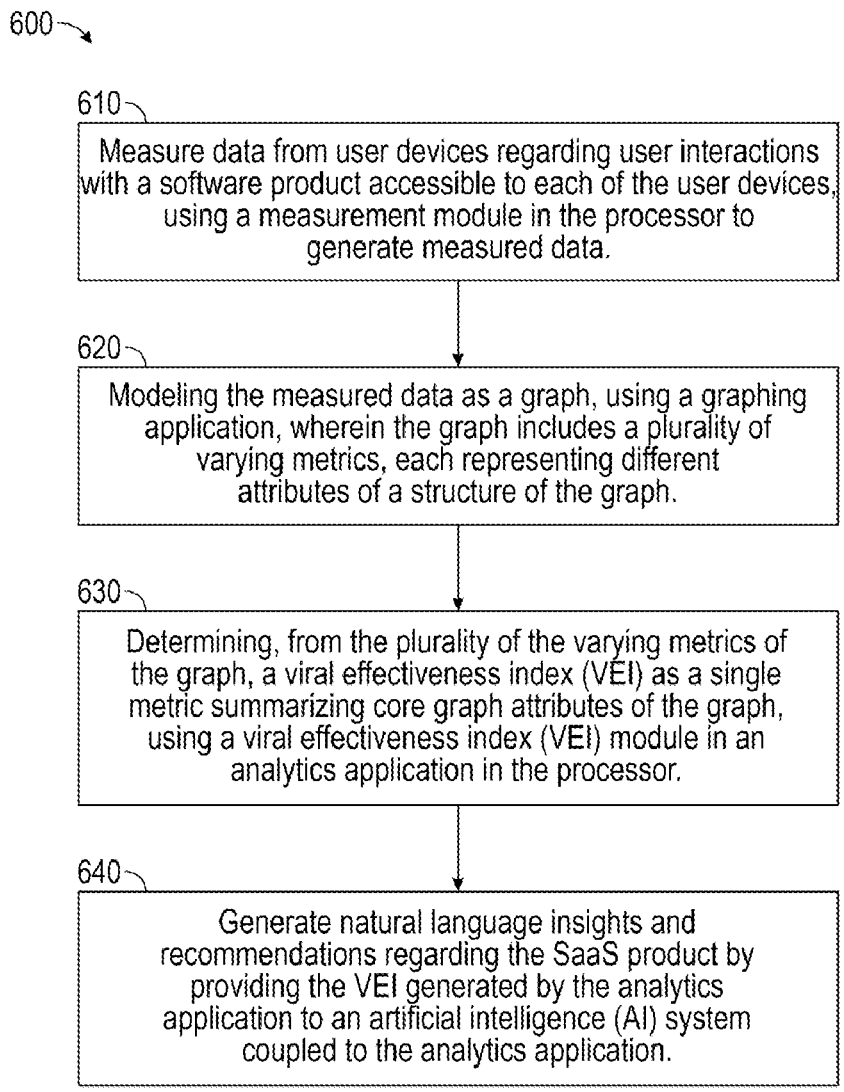
FIG. 6 is a flowchart of steps for implementing measuring virality and network effects in accordance with aspects of this disclosure.

Referring next to FIG. 6, a flowchart 600 is shown of operations of the analytics system 100 of FIGS. 1-5 in accordance with this disclosure. As shown in FIG. 6, a first step 610 of the measurement module 112 in the server 110 is to measure data from user devices 130A-130N regarding user interactions with a product, such as the applications 134A-134N installed in each of the user devices, using the measurement module 112 in the server 110 to generate measured data representing the degree of user interaction. In step 620 of FIG. 6, as described in more detail above, the measured data 113 is modeled as a graph 115, using a graphing application 114, wherein the graph includes a plurality of varying metrics, each representing different attributes of a structure of the graph 115. In step 630 of FIG. 6, as described in more detail above, a viral effectiveness index (VEI) 235 as a single metric summarizing core graph attributes of the graph 115 is determined from the plurality of the varying metrics of the graph, using a viral effectiveness index (VEI) generating module 230 in an analytics application in the processor. In step 640 of FIG. 6, as described in more detail above, natural language insights and recommendations regarding the SaaS product 134A-134N are generated by providing the VEI generated by the analytics application 116 to an artificial intelligence (AI) system 120 coupled to the analytics application 116.

The detailed examples of systems, devices, and techniques described in connection with FIGS. 1-6 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 7:
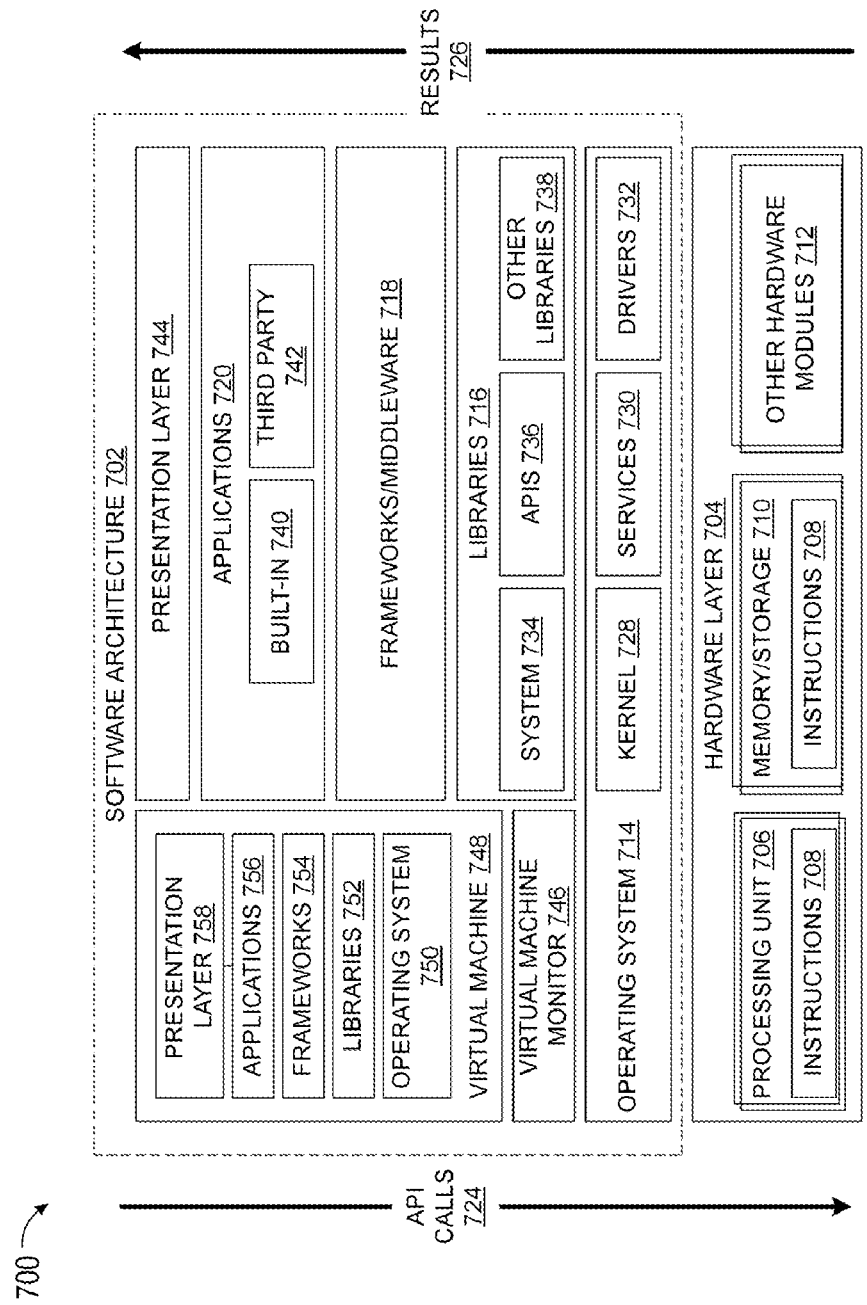
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture and it will be appreciated that many other architectures may be implemented to facilitate the functionality described herein. The software architecture 702 may execute on hardware such as client devices, native application provider, web servers, server clusters, external services, and other servers. A representative hardware layer 704 includes a processing unit 706 and associated executable instructions 708. The executable instructions 708 represent executable instructions of the software architecture 702, including implementation of the methods, modules and so forth described herein.

The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular system. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine depicted in block diagram 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
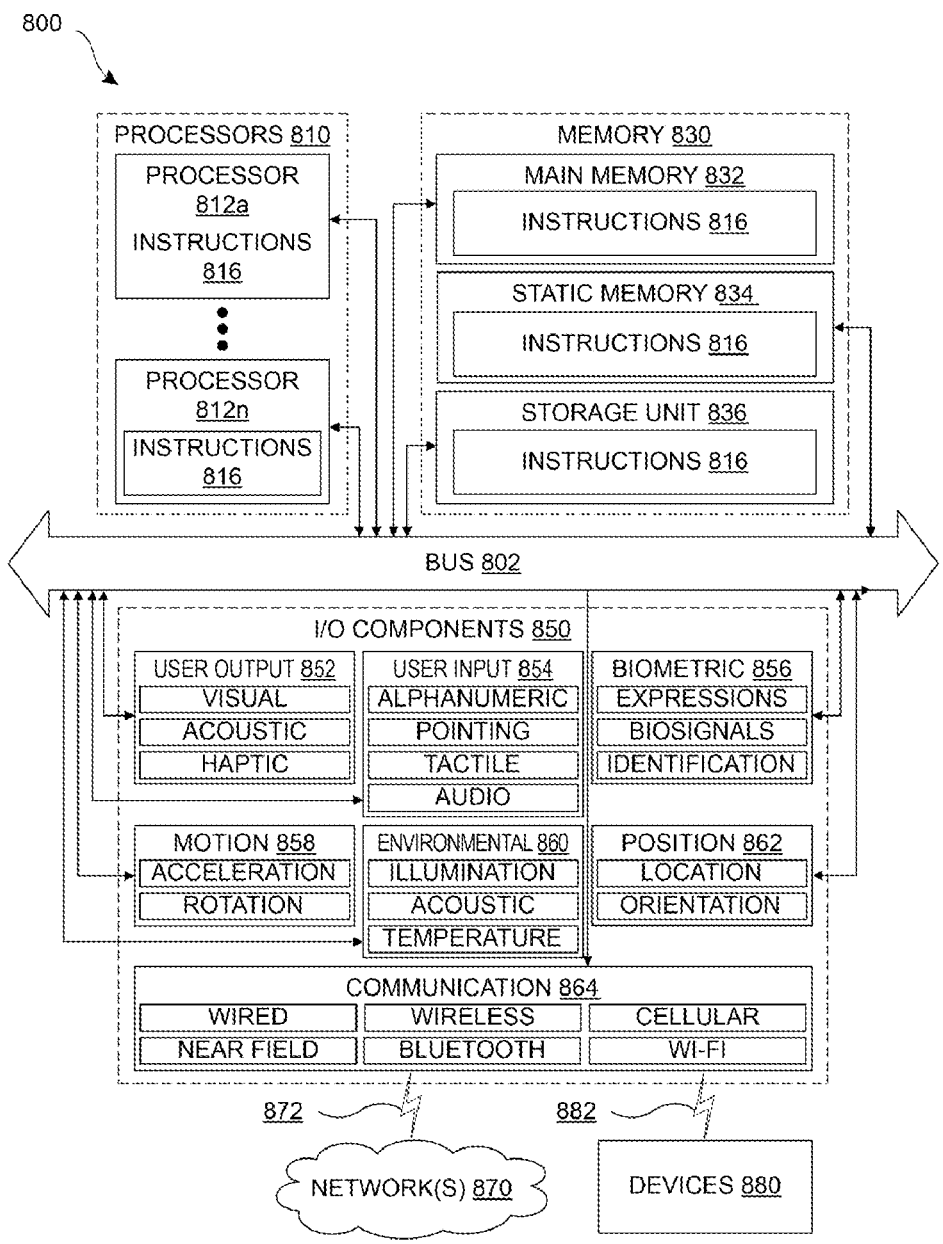
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement methods or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860 and/or position components 862, among a wide array of other environmental sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 862 may include, for example, location sensors (for example, a Global Position System (GPS) receiver), altitude sensors (for example, an air pressure sensor from which altitude may be derived), and/or orientation sensors (for example, magnetometers). The motion components 858 may include, for example, motion sensors such as acceleration and rotation sensors. The environmental components 860 may include, for example, illumination sensors, acoustic sensors and/or temperature sensors.

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1: A system including a processor and a machine-readable medium storing executable instructions that, when executed, cause the processor, alone or in combination with other processors, to perform operations including measuring data, from a plurality of user devices, regarding user interactions with a software product accessible to each of the user devices, using a measurement module in the processor to generate measured data, modeling the measured data as a graph model generated based on the measured data, using a graphing application, wherein the graph model includes a plurality of varying sub-metrics, each representing different attributes of a structure of the graph model, and determining, from the plurality of the varying sub-metrics of the graph model, a viral effectiveness index (VEI) as a single metric summarizing core graph attributes of the graph model using a VEI module in an analytics application in the processor, and generating natural language insights and recommendations regarding the software product by providing the VEI generated by the analytics application to an artificial intelligence (AI) system coupled to the analytics application.

Item 2: The system of item 1, wherein the software product is a software-as-a-service (SaaS) product.

Item 3: The system of item 1 or 2, wherein the natural language insights and recommendations from the AI system are generated based on the VEI and additional sub-metrics derived from partitioning the graph model into a plurality of subgraphs using an intrinsic key or property, and wherein the VEI module generates individual VEIs which are each a single metric summarizing core graph attributes of each of the subgraphs.

Item 4: The system of any one of items 1 to 3, wherein the instructions when executed, cause the processor, alone or in combination with other processors, to perform further operations of generating natural language outputs, via a natural language generating module of the analytics application, to produce natural language explanatory metrics and visuals from the VEI and on the sub-metrics.

Item 5: The system of any one of items 1 to 4, wherein the VEI is based on a vertex degrees of the graph.

Item 6: The system of any one of items 1 to 5, wherein the VEI is based on local clustering coefficients of the graph.

Item 7: The system of any one of items 1 to 6, wherein the VEI is based on connected component entropies of the graph.

Item 8: The system of any one of items 1 to 7, wherein the VEI is based on average shortest paths of the graph.

Item 9: The system of any one of items 1 to 8, wherein data from multiple metrics of a plurality of different software products are modeled to produce a plurality of graphs using the graphing application and wherein single VEIs are respectively computed for each of the plurality of graphs.

Item 10: A system including a processor and a machine-readable medium storing executable instructions that, when executed, cause the processor, alone or in combination with other processors, to perform operations including measuring user interaction data, from a plurality of user devices, regarding user interactions with a software product accessible to each of the user devices, using a measurement module in the processor to generate measured data, partitioning the measured data into n partitions based on an extrinsic key or property, using a measured interactions partitioning and graphing module in an analytics application in the processor, generating n graphs, one graph for each partition of the partitioned measured user interaction data, using the measured interactions partitioning and graphing module, which includes a graphing application, in the analytics application, determining, from the n graphs of the partitioned measured user interaction data, n viral effectiveness indexes (VEIs), one for each of the n graphs, wherein each VEI is a single metric summarizing core graph attributes of the corresponding one of the n graphs using a viral effectiveness index (VEI) module in an analytics application in the processor, and generating natural language insights and recommendations regarding the software product by providing the VEIs generated by the analytics application to an artificial intelligence (AI) system coupled to the analytics application.

Item 11: The system of item 10, wherein the software product is a software-as-a service (SaaS) product.

Item 12: The system of item 10 or 11, wherein the instructions, when executed, cause the processor, alone or in combination with other processors, to model the measured user interaction data as a graph model generated based on the measured user interaction data, separate from the n graphs generated by the measured interactions partitioning and graphing module, using the graphing application, and to perform further operations of partitioning the graph model into n subgraphs, based on an intrinsic key of property.

Item 13: The system of any one of items 10 to 12, wherein the instructions, when executed, cause the processor, alone or in combination with other processors, to perform further operations of generating, using the viral effectiveness index (VEI) module in an analytics application in the processor, n VEIs, one for each of the n subgraphs of the graph model.

Item 14: The system of any one of items 10 to 13, wherein the instructions, when executed, cause the processor, alone or in combination with other processors, to perform further operations of ranking the n VEIs in accordance with a numerical value of each of the n VEIs.

Item 15: A method for measuring data, from a plurality of user devices, regarding user interactions with a software product accessible to each of the user devices, using a measurement module in a processor to generate measured data, modeling the measured data as a graph model generated based on the measured data, using a graphing application, wherein the graph includes a plurality of varying sub-metrics, each representing different attributes of a structure of the graph, determining, from the plurality of the varying sub-metrics of the graph, a viral effectiveness index (VEI) as a single metric summarizing core graph attributes of the graph using a viral effectiveness index (VEI) module in an analytics application in the processor, and generating natural language insights and recommendations regarding the software product by providing the VEI generated by the analytics application to an artificial intelligence (AI) system coupled to the analytics application.

Item 16: A method of item 15, wherein the software product is a software-as-a service (SaaS) product.

Item 17: The method of item 15 or 16, wherein the natural language insights and recommendations from the AI system are generated based on the VEI and additional sub-metrics derived from partitioning the graph model into a plurality of subgraphs using an intrinsic key or property, and wherein the VEI module generates individual VEIs which are each a single metric summarizing core graph attributes of each of the subgraphs.

Item 18: The method of any one of items 15 to 17 further comprising generating natural language outputs, via a natural language generating module of the analytics application, to produce natural language explanatory metrics and visuals from the VEI.

Item 19: The method of any one of items 15 to 18 wherein data from multiple metrics of a plurality of different software products are modeled to produce a plurality of graphs using the graphing application and wherein a single VEI is computed for each of the generated graphs.

Item 20: The method of any one of items 15 to 19 wherein the VEI is based on at least one of: a vertex degrees of the graph; local clustering coefficients of the graph; connected component entropies of the graph; and average shortest paths of the graph.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

In the foregoing. detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached items and their equivalents. Also, various modifications and changes may be made within the scope of the attached items.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following items to item any and all applications, modifications and variations that fall within the true scope of the present teachings.

Unless otherwise stated, all measurements, values, ratings, positions, magnitudes, sizes, and other specifications that are set forth in this specification, including in the items that follow, are approximate, not exact. They are intended to have a reasonable range that is consistent with the functions to which they relate and with what is customary in the art to which they pertain.

The scope of protection is limited solely by the items and claims set forth herein. That scope is intended and should be interpreted to be as broad as is consistent with the ordinary meaning of the language that is used in the items and claims when interpreted in light of this specification and the prosecution history that follows and to encompass all structural and functional equivalents. Notwithstanding, none of the items or claims are intended to embrace subject matter that fails to satisfy the requirement of Sections 101, 102, or 103 of the Patent Act, nor should they be interpreted in such a way.

Except as stated immediately above, nothing that has been stated or illustrated is intended or should be interpreted to cause a dedication of any component, step, feature, object, benefit, advantage, or equivalent to the public, regardless of whether it is or is not recited in the items.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the items. In addition, in the foregoing Detailed Description, it can be seen that various features are grouped together in various examples for the purpose of streamlining the disclosure. This method of disclosure is not to be interpreted as reflecting an intention that the items require more features than are expressly recited in each item. Rather, as the following items reflect, inventive subject matter lies in less than all features of a single disclosed example. Thus, the following items are hereby incorporated into the Detailed Description, with each item standing on its own as a separately itemed subject matter.

What is claimed is:

1. A system comprising:
a processor; and
a machine-readable medium storing executable instructions that, when executed, cause the processor, alone or in combination with other processors, to perform a first set of operations comprising:
measuring data, via a measurement module in the processor, to provide measured data from a plurality of user devices regarding user interactions with a software product accessible to each of the user devices;
creating a graph model generated based on the measured data, using a graphing application, wherein the graph model includes a plurality of varying sub-metrics, each representing different attributes of a structure of the graph model; and
determining, from the plurality of the varying sub-metrics of the graph model, a viral effectiveness index (VEI) as a single metric summarizing core graph attributes of the graph model using a VEI module in an analytics application in the processor, wherein the VEI is a summary of graph connectedness of the graph model and provides a simplified presentation of the graph model with regard to user interactions with the software product;
providing the VEI generated by the analytics application to an artificial intelligence (AI) system coupled to the analytics application to provide an AI output; and
generating natural language insights and recommendations regarding the software product in response to the AI output.

2. The system of claim 1, wherein the software product is a software-as-a-service (SaaS) product.

3. The system of claim 1, wherein the natural language insights and recommendations from the AI system are generated based on the VEI and additional sub-metrics derived from partitioning the graph model into a plurality of subgraphs using an intrinsic key or property, and wherein the VEI module generates individual VEIs which are each a single metric summarizing core graph attributes of each of the subgraphs to provide a concise summary of graph connectedness of each of the subgraphs to provide a simplified presentation of the subgraphs regarding user interactions with the software product.

4. The system of claim 3, wherein the instructions when executed, cause the processor, alone or in combination with other processors, to perform further operations of generating natural language outputs, via a natural language generating module of the analytics application, to produce natural language explanatory metrics and visuals from the VEI and on the sub-metrics.

5. The system of claim 3, wherein the machine-readable medium includes instructions that, when executed, cause the processor, alone or in combination with other processors, to perform a second set of operations of:

partitioning the measured data into n partitions, based on an extrinsic key or property, using a measured interactions partitioning and graphing module in the analytics application in the processor;

generating n graphs, one graph for each partition of partitioned measured user interaction data, separate from the plurality of subgraphs generated using the intrinsic key or property, using the measured interactions partitioning and graphing module, which includes the graphing application, in the analytics application;

determining, from the n graphs of the partitioned measured user interaction data, n viral effectiveness indexes (n VEIs), one for each of the n graphs, wherein each n VEI is a single metric summarizing core graph attributes of a corresponding one of the n graphs using the VEI module in an analytics application in the processor; and generating natural language insights and recommendations regarding the software product by providing the n VEIs generated by the analytics application to the artificial intelligence (AI) system coupled to the analytics application.

6. The system of claim 5, wherein the extrinsic key or property is a user category and the intrinsic key or property is a community or cluster.

7. The system of claim 6, wherein the first set of operations and the second set of operations are performed simultaneously with the first set of operations.

8. The system of claim 6, wherein the first set of operations and the second set of operations are performed sequentially relative to one another.

9. The system of claim 1, wherein the VEI is based on vertex degrees of the graph model.

10. The system of claim 1, wherein the VEI is based on local clustering coefficients of the graph model.

11. The system of claim 1, wherein the VEI is based on connected component entropies of the graph model.

12. The system of claim 1, wherein the VEI is based on average shortest paths of the graph model.

13. The system of claim 1, wherein data from multiple metrics of a plurality of different software products are modeled to produce a plurality of graphs using the graphing application and wherein single VEIs are respectively computed for each of the plurality of graphs.

14. A system, comprising:
a processor; and
a machine-readable medium storing executable instructions that, when executed, cause the processor, alone or in combination with other processors, to perform operations comprising:

measuring user interaction data, via a measurement module in the processor, to provide measured user interaction data from a plurality of user devices regarding user interactions with a software product accessible to each of the user devices;

partitioning the measured user interaction data into n partitions based on an extrinsic key or property to generate partitioned measured user interaction data, using a measured interactions partitioning and graphing module in an analytics application in the processor;

generating n graphs, one graph for each partition of the partitioned measured user interaction data, using the measured interactions partitioning and graphing module, which includes a graphing application, in the analytics application;

determining, from the n graphs of the partitioned measured user interaction data, n viral effectiveness indexes (VEIs), one for each of the n graphs, wherein each VEI is a single metric summarizing core graph attributes and graph connectedness of a corresponding one of the n graphs using a viral effectiveness index (VEI) module in an analytics application in the processor to provide a simplified presentation of the n graphs with regard to user interactions with the software product;

providing the VEIs generated by the analytics application to an artificial intelligence (AI) system coupled to the analytics application to provide an AI output; and generating natural language insights and recommendations regarding the software product in response to the AI output.

15. The system of claim 14, wherein the software product is a software-as-a service (SaaS) product.

16. The system of claim 14, wherein the instructions, when executed, cause the processor, alone or in combination with other processors, to model the measured user interaction data as a graph model generated based on the measured user interaction data, separate from the n graphs generated by the measured interactions partitioning and graphing module, using the graphing application, and to perform further operations of partitioning the graph model into n subgraphs, based on an intrinsic key of property.

17. The system of claim 16, wherein the instructions, when executed, cause the processor, alone or in combination with other processors, to perform further operations of generating, using the viral effectiveness index (VEI) module in an analytics application in the processor, n VEIs, one for each of the n subgraphs of the graph model.

18. The system of claim 17, wherein the instructions, when executed, cause the processor, alone or in combination with other processors, to perform further operations of ranking the n VEIs in accordance with a numerical value of each of the n VEIs.

19. A method comprising:
measuring data, via a measurement module in a processor, to provide measured data from a plurality of user devices regarding user interactions with a software product accessible to each of the user devices;

creating a graph model generated based on the measured data, using a graphing application, wherein the graph model includes a plurality of varying sub-metrics, each representing different attributes of a structure of the graph model;

determining, from the plurality of the varying sub-metrics of the graph model, a viral effectiveness index (VEI) as a single metric summarizing core graph attributes of the graph model using a viral effectiveness index (VEI) module in an analytics application in the processor, wherein the VEI is a summary of graph connectedness of the graph model and provides a simplified presentation of the graph model with regard to user interactions with the software product;

providing the VEI generated by the analytics application to an artificial intelligence (AI) system coupled to the analytics application to provide an AI output; and generating natural language insights and recommendations regarding the software product in response to the AI output.

20. A method of claim 19, wherein the software product is a software-as-a service (SaaS) product.

21. The method of claim 19, wherein the natural language insights and recommendations from the AI system are generated based on the VEI and additional sub-metrics derived from partitioning the graph model into a plurality of subgraphs using an intrinsic key or property, and wherein the VEI module generates individual VEIs which are each a single metric summarizing core graph attributes of each of the subgraphs to provide a concise summary of graph connectedness of each of the subgraphs to provide a simplified presentation of the subgraphs regarding user interactions with the software product.

22. The method of claim 19 further comprising generating natural language outputs, via a natural language generating module of the analytics application, to produce natural language explanatory metrics and visuals from the VEI.

23. The method of claim 19 wherein data from multiple metrics of a plurality of different software products are modeled to produce a plurality of graphs using the graphing application and wherein a single VEI is computed for each of the generated graphs.

24. The method of claim 19 wherein the VEI is based on at least one of: a vertex degrees of the graph model; local clustering coefficients of the graph model; connected component entropies of the graph model; and average shortest paths of the graph model.

* * * * *